US012667800B2

(12) United States Patent
Nagel et al.

(10) Patent No.: US 12,667,800 B2
(45) **Date of Patent: *Jun. 30, 2026**

(54) HEALTH METER

(71) Applicant: EAGLE XIENCE TECHNOLOGIES LIMITED, Glasgow (GB)

(72) Inventors: Henry Nagel, Houston, TX (US); Andreas Nagel, Houston, TX (US); Paul Whiting, Houston, TX (US)

(73) Assignee: EAGLE XIENCE TECHNOLOGIES LIMITED, Glasgow (GB)

( * ) Notice: Subject to any disclaimer, the term of this patent is extended or adjusted under 35 U.S.C. 154(b) by 1032 days.

This patent is subject to a terminal disclaimer.

(21) Appl. No.: 17/782,077

(22) PCT Filed: Dec. 2, 2020

(86) PCT No.: PCT/US2020/062822
§ 371 (c)(1),
(2) Date: Jun. 2, 2022

(87) PCT Pub. No.: WO2021/113313
PCT Pub. Date: Jun. 10, 2021

(65) Prior Publication Data
US 2023/0001336 A1 Jan. 5, 2023

Related U.S. Application Data

(63) Continuation of application No. 16/701,400, filed on Dec. 3, 2019, now Pat. No. 10,864,467.

(51) Int. Cl.
B01D 35/143 (2006.01)
B01D 29/15 (2006.01)
(Continued)

(52) U.S. Cl.
CPC ......... B01D 35/1435 (2013.01); B01D 29/15 (2013.01); B01D 29/54 (2013.01);
(Continued)

(58) Field of Classification Search
CPC .... G06F 16/00; G06F 16/5866; G06F 16/904; G06F 18/2411; G06F 18/2431;
(Continued)

(56) References Cited

U.S. PATENT DOCUMENTS 4,559,138 A * 12/1985 Harms, II .............. B01D 29/21
210/493.1
4,855,041 A 8/1989 Church
(Continued)

FOREIGN PATENT DOCUMENTS

EP 2484422 A1 8/2012
WO 9507745 A1 3/1995

OTHER PUBLICATIONS

International Search Report and Written Opinion for Corresponding PCT Application No. PCT/US2020/062822, dated Apr. 1, 2021, 6 pages.
(Continued)

*Primary Examiner* — Kristina M Deherrera
*Assistant Examiner* — Gedeon M Kidanu
(74) *Attorney, Agent, or Firm* — Nolte Lackenbach Siegel

(57) ABSTRACT

A health meter with decontamination device for contaminated fluid with a metal casing body with sealable metal lid, inlet port and outlet port, a removable open bucket having a docking lid and a plurality of openings, a hollow tube with an opening connected to an outlet port, a convex reinforcing spacer in the removable open bucket, a compressible decontamination media and a reinforcing seat in the removable open bucket. Contaminated fluid flows into the metal casing body between the removable open bucket and metal casing body
(Continued)

body through openings in the docking lid into the compressible decontamination media sequentially into the hollow tube and out the outlet port while an inlet and outlet electrode and two sensors in the media communicate with a controller via a network to a plurality of client devices for automatic remote monitoring.

19 Claims, 14 Drawing Sheets

(51) Int. Cl.

| | |
|---|---|
| *B01D 29/54* | (2006.01) |
| *B01D 35/30* | (2006.01) |
| *G01N 27/10* | (2006.01) |

(52) U.S. Cl.

CPC ...... *B01D 35/306* (2013.01); *B01D 2201/291* (2013.01); *B01D 2201/56* (2013.01); *G01N 27/10* (2013.01)

(58) Field of Classification Search

CPC ..... G06F 3/0481; G06N 99/00; G06T 11/206; G06T 3/40; B01D 2201/291; B01D 2201/305; B01D 2201/4084; B01D 2201/54; B01D 2201/56; B01D 29/15; B01D 29/54; B01D 35/1435; B01D 35/306; B01D 36/001; F16N 29/00; F16N 39/00

See application file for complete search history.

(56) References Cited

U.S. PATENT DOCUMENTS

| | | | |
|---|---|---|---|
| 5,066,391 A | | 11/1991 | Faria |
| 5,071,552 A | | 12/1991 | Bikson |
| 5,470,469 A | | 11/1995 | Eckman |
| 5,484,523 A | | 1/1996 | Bjornsson |
| 5,601,717 A | * | 2/1997 | Villette ................. B01D 46/42 |
| | | | 55/497 |
| 5,770,065 A | | 6/1998 | Popoff |
| 6,113,781 A | | 9/2000 | Popoff |
| 6,142,179 A | | 11/2000 | Bjornsson |
| 6,488,845 B1 | | 12/2002 | Neufeld |
| 6,652,740 B2 | | 11/2003 | Schoess |
| 7,188,732 B2 | | 3/2007 | Bjornsson |
| 7,329,342 B2 | | 2/2008 | Faria |
| 8,257,581 B2 | | 9/2012 | Ferrari |
| 9,914,076 B2 | | 3/2018 | Koreis |
| 10,222,364 B2 | | 3/2019 | Whiting |
| 10,253,927 B2 | | 4/2019 | Whiting et al. |
| 10,413,851 B2 | | 9/2019 | Wolhowe |
| 2003/0015465 A1 | | 1/2003 | Fick |
| 2003/0024868 A1 | | 2/2003 | Hallan et al. |
| 2003/0178354 A1 | | 9/2003 | Wall |
| 2003/0226790 A1 | | 12/2003 | Brown |
| 2006/0102534 A1 | | 5/2006 | Faria |
| 2015/0343348 A1 | | 12/2015 | Morris |
| 2016/0317958 A1 | | 11/2016 | Falc'Hon |
| 2018/0347751 A1 | | 12/2018 | Whiting |

OTHER PUBLICATIONS

Supplemental European Search report for Corresponding European Application No. 20896105.2, dated Dec. 19, 2022, 7 pages.
PCT/US2020/062822, International Search Report and Written Opinion dated Apr. 1, 2021, 6 pages—English.

* cited by examiner

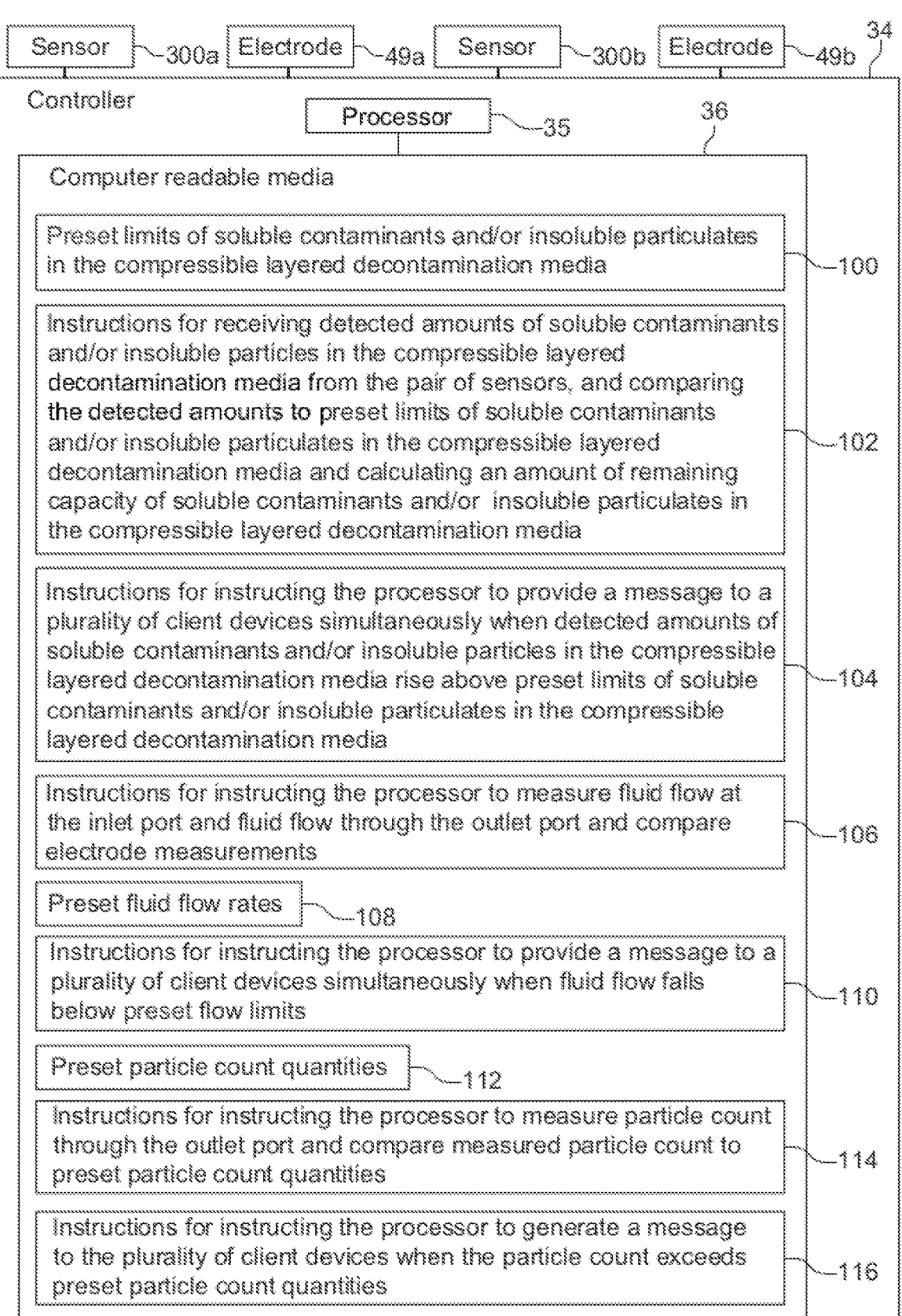

Sensor ⎯300a    Electrode ⎯49a    Sensor ⎯300b    Electrode ⎯49b    34

Controller

Processor ⎯35        36

Computer readable media

Preset limits of soluble contaminants and/or insoluble particulates in the compressible layered decontamination media ⎯100

Instructions for receiving detected amounts of soluble contaminants and/or insoluble particles in the compressible layered decontamination media from the pair of sensors, and comparing the detected amounts to preset limits of soluble contaminants and/or insoluble particulates in the compressible layered decontamination media and calculating an amount of remaining capacity of soluble contaminants and/or insoluble particulates in the compressible layered decontamination media ⎯102

Instructions for instructing the processor to provide a message to a plurality of client devices simultaneously when detected amounts of soluble contaminants and/or insoluble particles in the compressible layered decontamination media rise above preset limits of soluble contaminants and/or insoluble particulates in the compressible layered decontamination media ⎯104

Instructions for instructing the processor to measure fluid flow at the inlet port and fluid flow through the outlet port and compare electrode measurements ⎯106

Preset fluid flow rates ⎯108

Instructions for instructing the processor to provide a message to a plurality of client devices simultaneously when fluid flow falls below preset flow limits ⎯110

Preset particle count quantities ⎯112

Instructions for instructing the processor to measure particle count through the outlet port and compare measured particle count to preset particle count quantities ⎯114

Instructions for instructing the processor to generate a message to the plurality of client devices when the particle count exceeds preset particle count quantities ⎯116

FIG. 6A

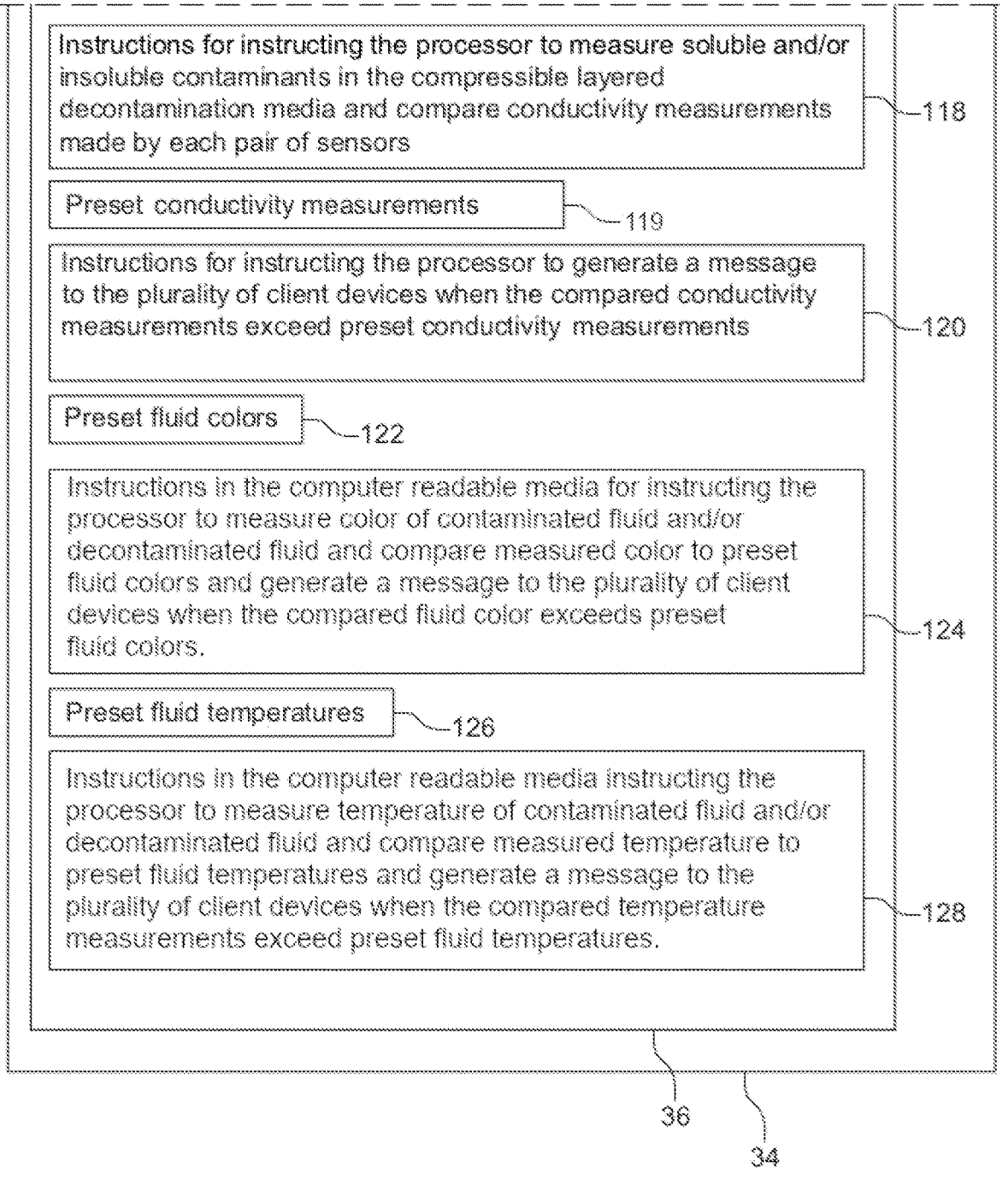

Instructions for instructing the processor to measure soluble and/or insoluble contaminants in the compressible layered decontamination media and compare conductivity measurements made by each pair of sensors —118

Preset conductivity measurements —119

Instructions for instructing the processor to generate a message to the plurality of client devices when the compared conductivity measurements exceed preset conductivity measurements —120

Preset fluid colors —122

Instructions in the computer readable media for instructing the processor to measure color of contaminated fluid and/or decontaminated fluid and compare measured color to preset fluid colors and generate a message to the plurality of client devices when the compared fluid color exceeds preset fluid colors. —124

Preset fluid temperatures —126

Instructions in the computer readable media instructing the processor to measure temperature of contaminated fluid and/or decontaminated fluid and compare measured temperature to preset fluid temperatures and generate a message to the plurality of client devices when the compared temperature measurements exceed preset fluid temperatures. —128

HEALTH METER

RELATED APPLICATIONS

This application relates to and claims priority from PCT Ser. No.: PCT/US2020/062822 filed Dec. 2, 2020, which in turn claims priority to U.S. Ser. No. 16/701,400 filed Dec. 3, 2019.

FIELD

The present embodiments generally relate to a health meter for measuring decontaminated fluids, particularly transmission fluids.

BACKGROUND

A need exists for a remotely operable system that not only decontaminates fluids but also provides messaging and alarms when decontaminated fluid falls or exceeds preset limits or outside defined parameters.

The present embodiments meet these needs.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIGS. 6A and 6B depict a diagram of a controller according to one or more embodiments of the invention.

Figure 1:
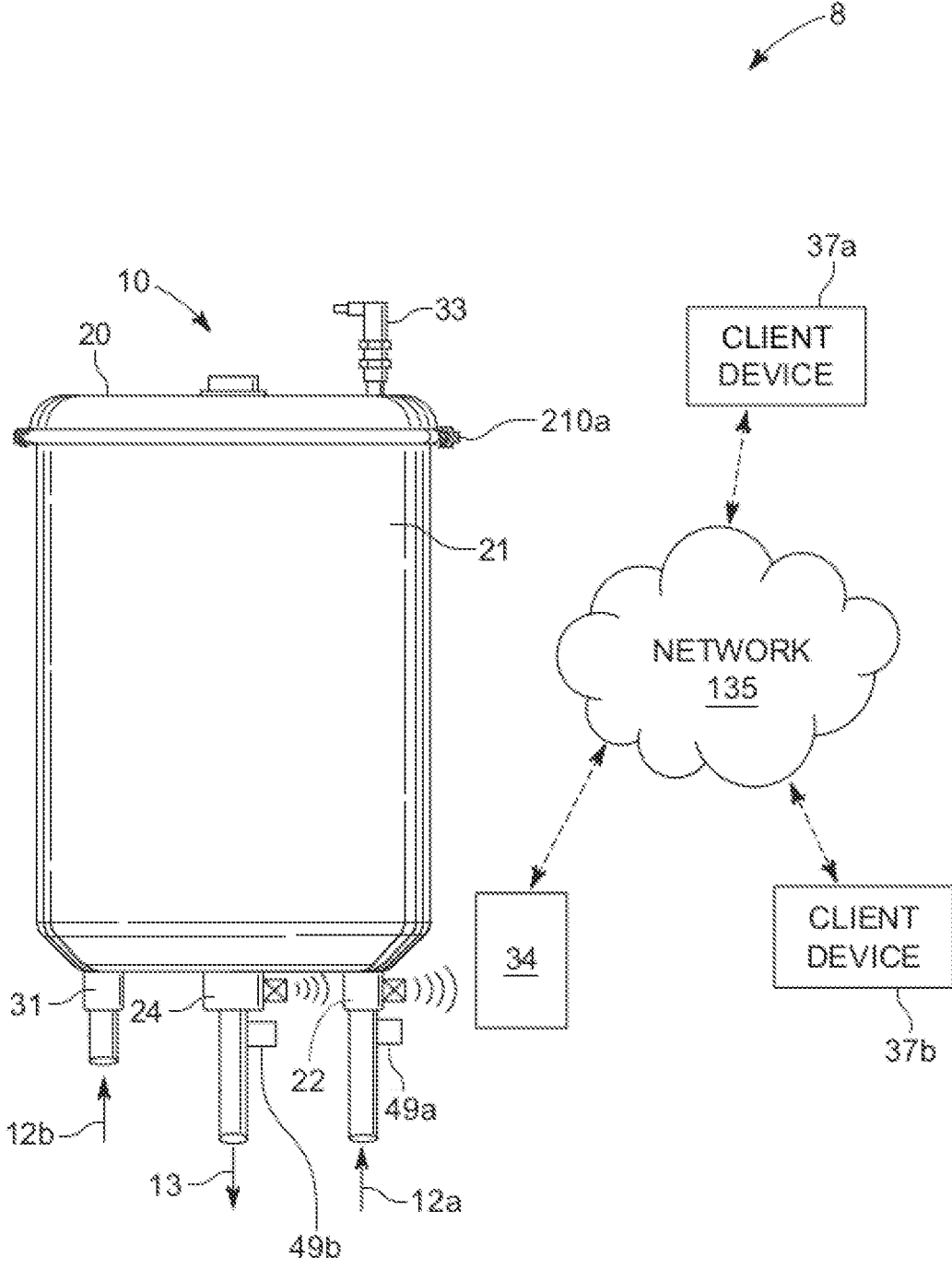
FIG. 1 is a diagram of the health meter according to one or more embodiments.

The present embodiments are detailed below with reference to the listed Figures.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking, for those of ordinary skill in the art, having the benefit of this disclosure.

Before explaining the present apparatus in detail, it is to be understood that the apparatus is not limited to the particular embodiments and that it can be practiced or carried out in various ways and utilized or applied in various ways.

Specific structural and functional details disclosed herein are not to be interpreted as limiting, but merely as a basis of the claims and as a representative basis for teaching persons having ordinary skill in the art to variously employ the present invention.

The health meter can help prevent destruction of wildlife and fish when used in a marine environment.

The health meter can provide continuous decontamination of transmission fluids and provide immediate alarms and messages to the operator.

The embodiments extend equipment life by eliminating the need to service fluid for equipment, reducing the possibility of spilling oil into the environment, thereby reducing carbon footprint.

A benefit of the invention is that there is a reduction in the need to dispose of used transmission fluids by using the invention.

The embodiments provide a longer life for equipment seals and enable an operator to identify if fluid of equipment is healthy by continuously and automatically measuring fluid condition. The invention improves lubrication conditions in operating equipment.

The embodiments reduce the risk of fires and explosions through proactive real time live monitoring therefore critical failure can be anticipated.

The invention with certain fluids can reduce high levels of contamination and thereby reduce the presence of static discharge within the system.

The invention relates to a health meter having a decontamination device for contaminated fluid with a metal casing body with sealable metal lid in an embodiment.

The sealable metal lid has a triple purpose.

The sealable metal lid prevents unauthorized persons from coming into contact with fluid contaminants which is a health and safety issue. The sealable metal lid would have to be damaged to gain access to the metal casing body. The sealable metal lid also preserves decontamination for lab examination.

The metal casing body with sealable metal lid has an inlet port and an outlet port.

The invention includes a removable open bucket having a docking lid.

The docking lid has a plurality of vents. Some vents have two openings.

The removable open bucket has a hollow tube with an opening.

The hollow tube is centrally positioned in the removable open bucket and is connected to the outlet port.

The invention has a convex reinforcing spacer.

A compressible decontamination media is contained between the convex reinforced spacer and the docking lid.

The removable open bucket contains a reinforcing seat on which rests the convex reinforcing spacer.

The health meter receives contaminated fluid via at least one inlet port of the decontamination device through the vents in the docking lid flows the contaminated fluid into the compressible layered decontamination media with sensors simultaneously forming decontaminated fluid as the controller continuously monitors remaining decontamination capacity of the health meter.

In embodiments, the removable open bucket, the convex reinforcing spacer and the reinforcing seat comprise a flexible material comprising a polymer selected from the group: polyethylene polyketone (PEEK), homopolymers of polyethylene, homopolymers of polypropylene, polyvinyl chloride and copolymers thereof.

In embodiments of the health meter, the metal casing body and sealable metal lid operate from −20 degrees Celsius to +120 degrees Celsius without clogging, without reducing flow rates, and without deforming dependent on contaminated fluid physical characteristics.

The following terms are used herein:

The term "compressible decontamination media" can refer to cellulose media. The compressible media can be a recycled material with a porosity enabling a fluid flow of contaminated fluid, such as transmission fluid, water, or glycol, at a rate of 0.1 to 10 liters per minute per removable open bucket. In embodiments, the compressible material can be a rolled material, made from cellulose fibers or similar fibrous material. In embodiments, the compressible material can be paper.

The term "convex reinforcing spacer" refers to a device with a plurality of ribs. The convex reinforcing spacer can have a diameter from 150 to 190 millimeters. Each spacer can have in cross section ribs that are tapered at an angle between 15 and 18 degrees. Each spacer can have an outer ring with 10 to 16 attached ribs around a hollow center that clip into the hollow tube. Clips can be used projecting from the hollow center to engage the hollow tube. The clips keep the convex reinforcing spacer a distance from the hollow tube. The convex reinforcing spacer can have a corrugated edge on each of the attached spokes to allow the decontaminated fluid to flow between spokes for higher flow rates.

The term "docking lid" refers to the lid that is installed over the removable open bucket and contained within the metal casing body with sealable metal lid. The docking lid enables a second removable open bucket to be stacked on the docking lid of a first removable open bucket for simultaneous processing of contaminated fluid. The docking lids have openings which are defined herein. The docking lids not only provide openings but also provide load support as the removable open buckets become heavier with contaminated liquid.

The term "sealable metal lid" refers to a thin lid that can be metal that engages with the metal casing body by using fasteners. The sealable metal lid in embodiments can have a thickness of between 1 to 2 millimeters. The sealable metal lid can be flat or sloped. The sealable metal lid can have a diameter between 100 millimeters and 240 millimeters. The sealable metal lid can be sloped at an angle between 5 and 30 degrees. In embodiments, the sealable metal lid is made from stainless steel.

The term "reinforcing seat" refers to a structure that can be integral with the removable open bucket. The reinforcing seat has a lip that provides reinforcement keeping the seat self-centering in the removable open bucket. The reinforcing seat can be made from the same material as the removable open bucket. Other materials may be bonded to the reinforcing seat.

The term "openings" refers to a plurality of individual slits or cutouts formed in the docking lid. The opening in embodiments can be a double opening. The openings can have a variety of shapes, such as triangular shaped openings. The openings can vary in size. The openings can have opening dimensions with widths ranging from 2 to 8 millimeters. In embodiments, the openings can vary in size around the docking lid.

Between 2 and 30 openings can be used in each docking lid. In embodiments, the opening can be oriented concentrically around the hollow tube.

The embodiments can operate as a health meter for gear boxes or turbines or other systems such as compressors.

The embodiments can attach to a lubrication reservoir of a turbine.

Turning now to the Figures, FIG. 1, depicts a health meter 8 with a decontamination device 10 configured to receive contaminated fluid 12a and 12b through inlet ports 22 and 31 of a metal casing body 21.

In embodiments, the second inlet port in the metal casing body permit parallel connection of multiple decontamination devices for parallel processing of contaminated fluid.

The contaminated fluid flows into the metal casing body 21 between a removable open bucket (not shown) and the metal casing body 21. A sealable metal lid 20 engages the metal casing body 21 in a fluid tight connection.

Contaminated liquid then flows through a plurality of openings in a docking lid (not shown in FIG. 1) adjacent the sealable metal lid 20 and into a removable open bucket (shown in FIG. 2) and through a compressible decontamination media (shown in FIG. 2) then sequentially into a hollow tube and then through an outlet of the removable open bucket to outlet port 24 of the metal casing body.

An outlet electrode 49b is positioned in or proximate to the outlet port 24 of the metal casing body and an inlet electrode 49a is positioned in or proximate the first inlet port 22 of the metal casing body.

The health meter 8 not only includes the decontamination device 10 but also includes a controller 34 in communication with a network 135 and a plurality of client devices 37a and 37b. The controller communicates bidirectionally with the inlet and outlet electrodes.

The inlet and outlet electrodes provide information on at least one of: fluid flow and compressible decontamination media contaminant capacity, fluid color, fluid temperature, fluid conductivity, and particle count in the fluid when the contaminated fluids 12a and 12b enter the decontamination device and as decontaminated fluid 13 leaves the decontamination device.

In FIG. 1, at least one clamp, clamp 210a is used. Clamp 210a secures the sealable metal lid 20 to the metal casing body 21. The clamp can be a V-band clamp.

FIG. 1 depicts an embodiment with a sample port 33 for controllably removing fluid sample out of the decontamination device 10 for analysis by a laboratory. In embodiments, continuous sampling is contemplated via the sample port which can also be automatically initiated by the controller 34.

FIG. 1 depicts an assembled version of the health meter 8.

The inlet electrode and outlet electrode can be in wired communication with the network, however, FIG. 1 shows an embodiment of a wireless communication with the network.

Figure 2A:
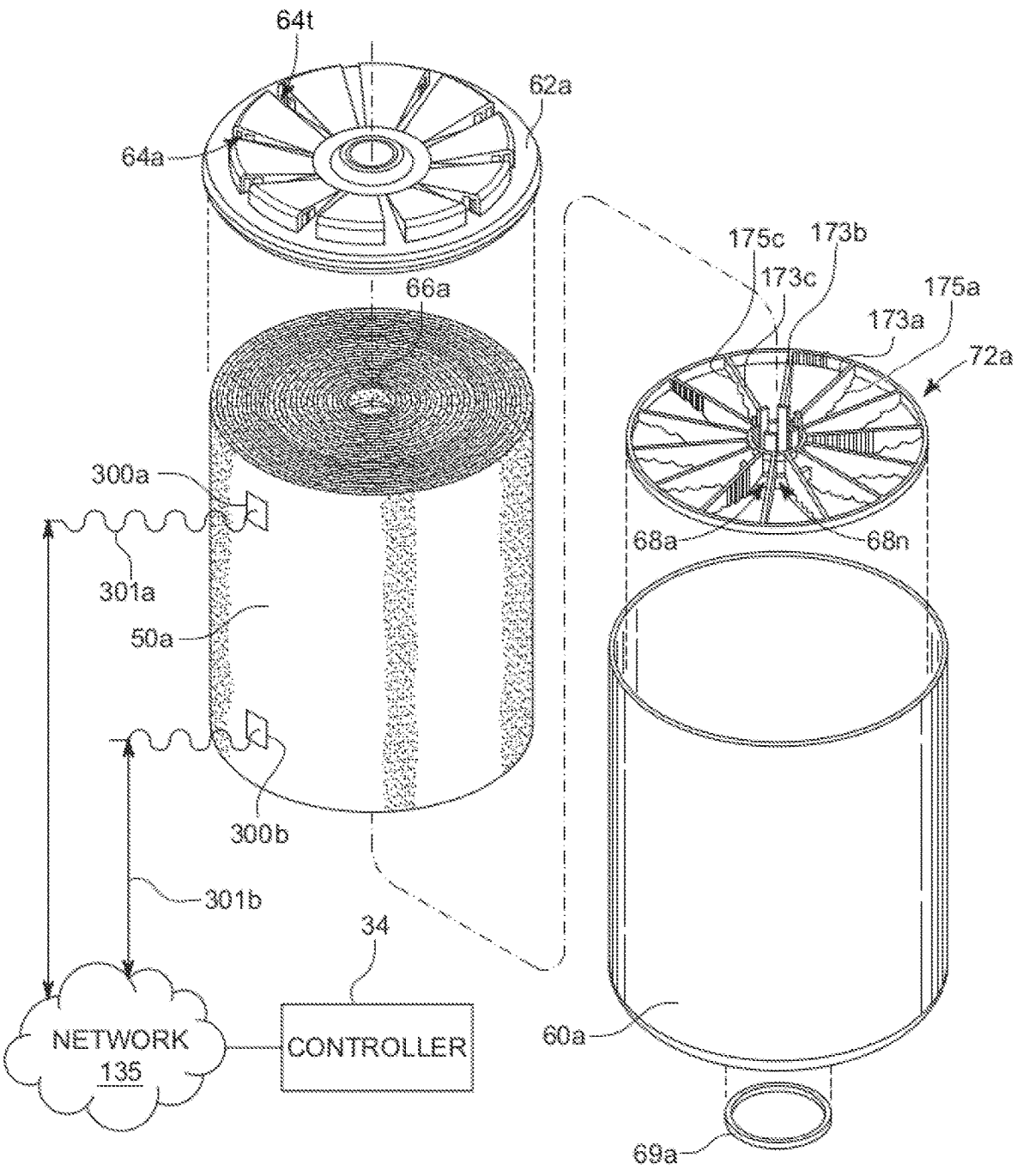
FIGS. 2A and 2B are exploded views of one of the removable open buckets with docking lid according to one or more embodiments.
Figure 2B:
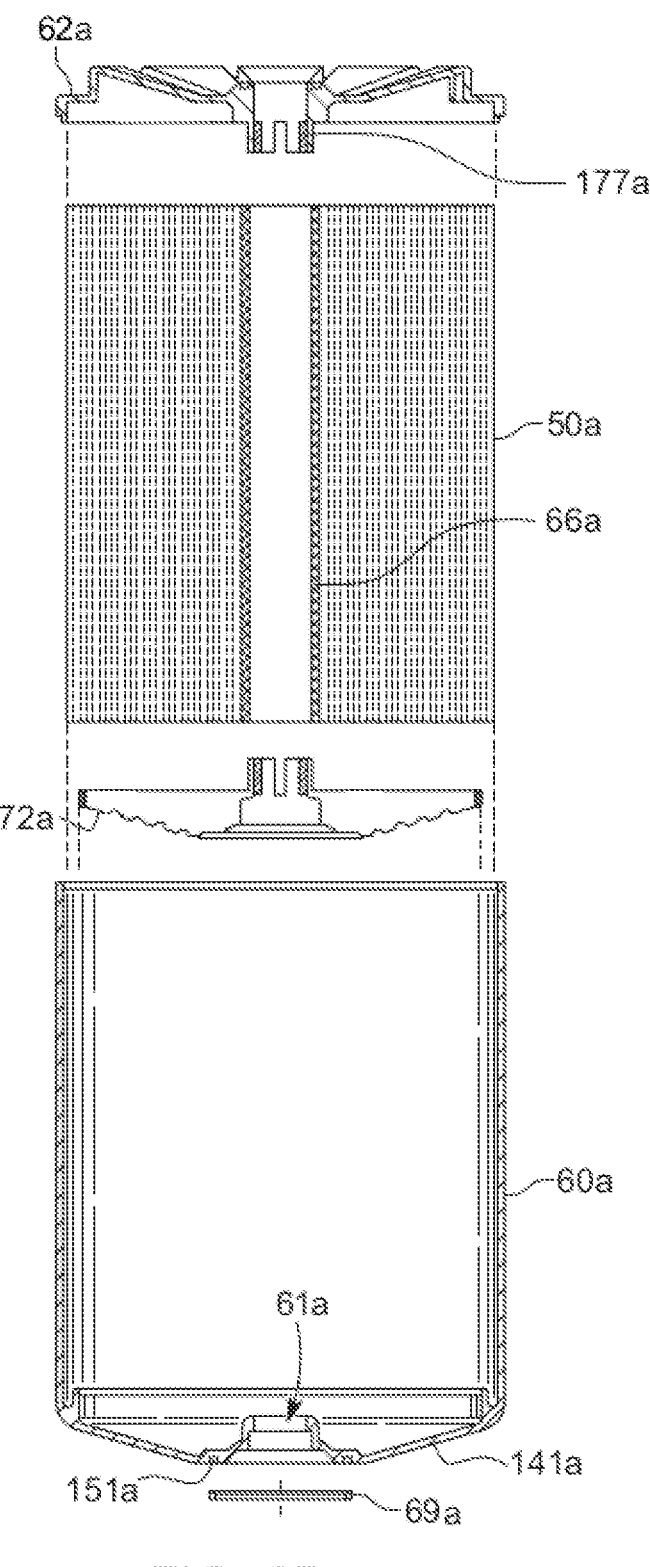

FIGS. 2A and 2B show at least one removable open bucket 60a that is contained between the metal casing body and a sealable metal lid.

Each removable open bucket has a tapered docking base 141a with a removable open bucket outlet 61a. The tapering can be 10 degrees to 30 degrees from a longitudinal axis of a hollow tube.

Each removable open bucket has a docking lid locating seat 177a.

Each removable open bucket has a reinforcing seat 52 (shown in FIG. 4) formed within each removable open bucket.

Returning to FIGS. 2A and 2B, each removable open bucket has a convex reinforcing spacer 72a positioned within the reinforcing seat around the removable open bucket outlet 61.

The convex reinforcing seat has a plurality of ribs. Ribs 173a-c are labelled in this Figure. Between 4 and 16 ribs can be used in embodiments.

Each rib can have at least one reinforcing spoke. Reinforcing spokes 175a-175c are labelled. Between 4 and 42 reinforcing spokes can be used in embodiments.

The convex reinforcing seat 72a has a plurality of openings. Openings 68a-68n are depicted. Between 4 and 30 openings can be used in embodiments.

A docking lid 62a is shown. Each docking lid is configured to sealingly engage a removable open bucket. Docking lid 62a engage removeable open bucket 60a.

The docking lid 62a has a plurality of vents. Vents 64a-t are labeled. Between 2 and 28 vents can be used in docking lids in embodiments.

Figure 7A:
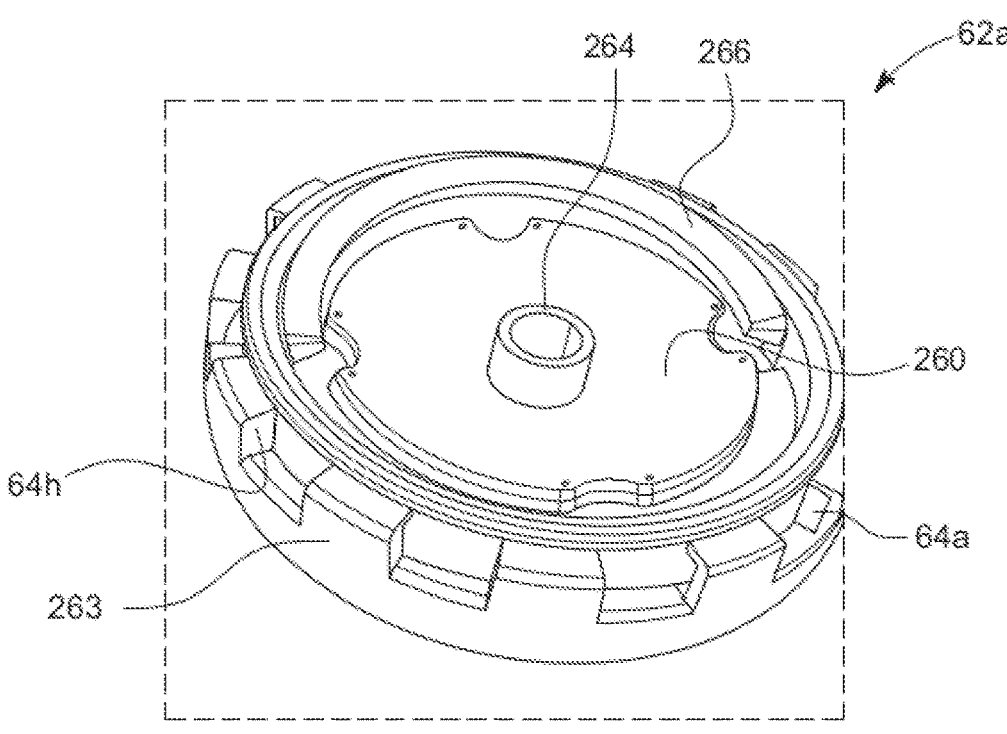
FIG. 7A is a view of a docking lid on the side that engages another open bucket or a threaded rod with venting port that engages a sealable metal lid according to one or more embodiments.

The plurality of vents are formed on a perimeter of the docking lid 62a. The perimeter 263 is shown in FIG. 7A.

A hollow tube 66a is connected between a centrally disposed hollow tube locator 177a and the removable open bucket outlet 61a.

The hollow tube can be made from cardboard, a metal, and a flexible material comprising a polymer selected from the group: polyethylene poly ketone (PEEK), homopolymers of polyethylene, homopolymers of polypropylene, polyvinyl chloride and copolymers thereof.

The hollow tube can have a length from 200 millimeters to 240 millimeters.

The hollow tube can have an inner diameter from 20 millimeters to 35 millimeters.

The hollow tube is envisioned as cylinder in embodiments. In other embodiments, it may be tapered.

The hollow tube can have wall thickness from 2 millimeters to 6 millimeters.

A compressible layered decontamination media 50a is contained between the docking lid 62a and the convex reinforcing spacer 72a.

A pair of sensors 300a and 300b are depicted encapsulated between layers of the compressible layered decontamination media 50a transmitting measured physical properties 301a and 301b to the network 135.

The network can be a cellular network, the internet, and other global communication network, a satellite network, a local area network, a wide area network a VPN, or combinations thereof.

A controller 34 with processor 35 (shown in FIG. 6A) and computer readable media 36 (shown in FIG. 6A) is in communication with the pair of sensors 300ab and with the inlet and outlet electrodes shown on FIG. 1.

The computer readable media, which is non-evanescent, can be a computer hard drive, a jump drive, or a cloud-based data storage system. The computer readable media contains instructions for the processor to receive detected amounts of soluble contaminants and/or insoluble particles in the compressible layered decontamination media from the pair of sensors, compare the detected amounts to preset limits of soluble contaminates and/or insoluble particulates in the compressible layered decontamination media, calculate an amount of remaining capacity of soluble contaminants and/or insoluble particulates in the compressible layered decontamination media, and provide a message to a plurality of client devices simultaneously via the network when detected amounts of soluble contaminants and/or insoluble particles in the compressible layered decontamination media rise above preset limits of soluble contaminates and/or insoluble particulates in the compressible layered decontamination media.

The health meter includes a seal locating groove 151a formed on an external side of the tapered docking base 141a for engaging a seal ring 69a mounted between the docking lid 62a and the tapered docking base 141a when removeable open buckets are stacked in fluid communication with one another.

The seal ring 69 van be made from thermoplastic, such as an o-ring.

The seal locating groove can have a depth from 2% to 20% the wall thickness of the tapered docking base 141a.

In this embodiment, the convex reinforcing spacer fits within the reinforcing seat while supporting the compressible decontamination media in each removable open bucket.

Figure 3:
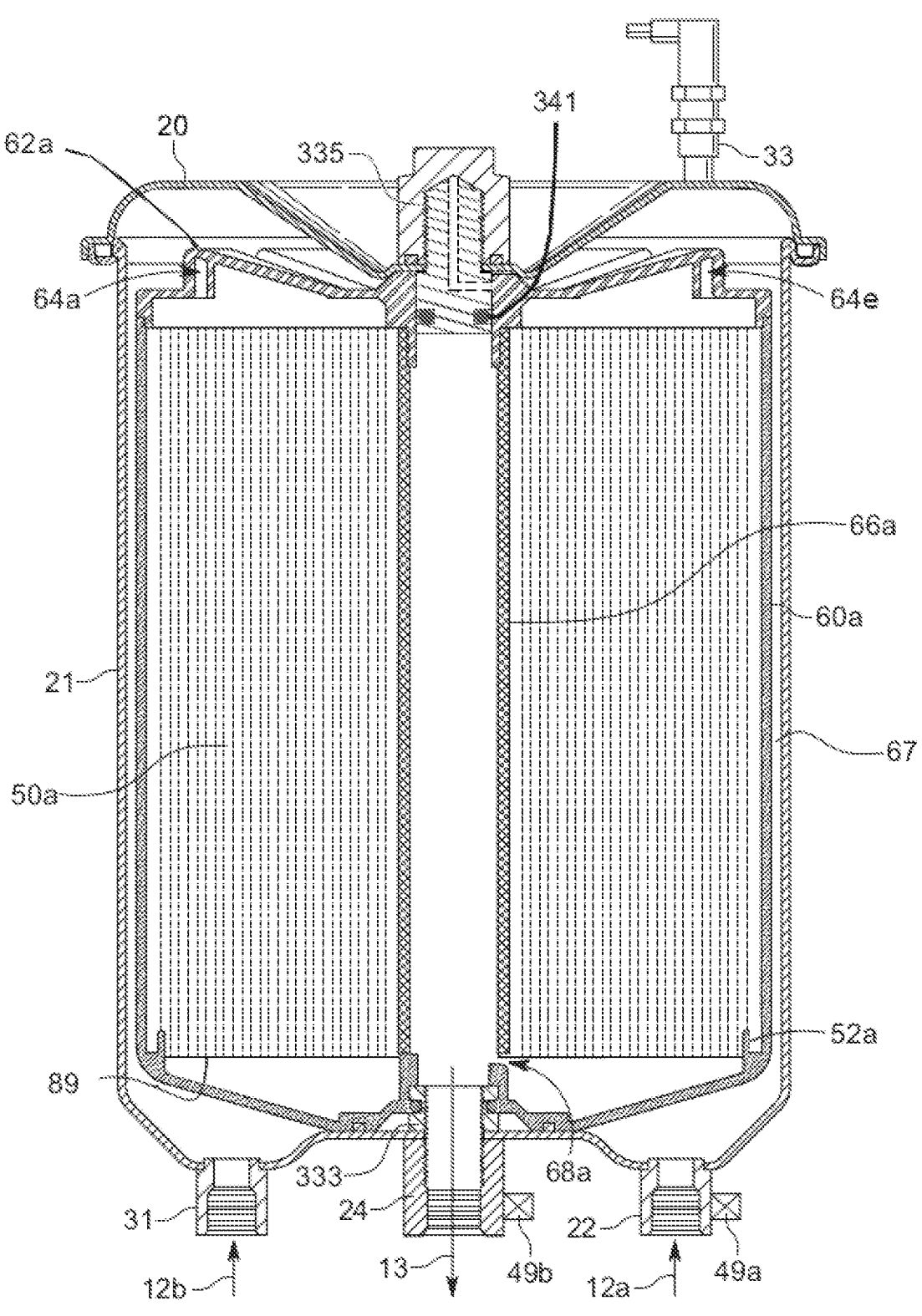
FIG. 3 depicts a cross sectional view of an embodiment of the health meter.

FIG. 3 shows the decontamination device 10 in cross section.

In this FIG. 3 the contaminated fluids 12a and 12b flow into the metal casing body 21 into a common space 67. The contaminated fluids enter through the inlet ports 22 and 31. The common space 67 is between the metal casing body 21 and the removable open bucket 60a.

From the common space 67, the contaminated fluid flows through the plurality of vents 64a-64e formed in the docking lid 62a beneath the sealable metal lid 20 which is affixed to the metal casing body 21.

In the removable open bucket 60a, is a compressible decontamination media 50a located around a hollow tube 66a and seated on a reinforcing seat 52a.

The reinforcing seat 52a can extend between 3 millimeters and 20 millimeters from tapered docking base on an interior portion of the removable open bucket 60a.

The contaminated fluid 12a and 12b flows simultaneously, and into the compressible decontamination media 50a.

This version of the decontamination device also has an inlet electrode 49a positioned in or proximate to the inlet port 22 and an outlet electrode 49b positioned in or proximate to the outlet port 24. The electrodes are used to monitor fluid flow rates.

Decontaminated fluid 13 flows from the compressible decontamination media 50a through a plurality of openings 68a is shown in this Figure into the hollow tube 66a which is fluidly connected to a sealing centralizer 333.

Figure 10:
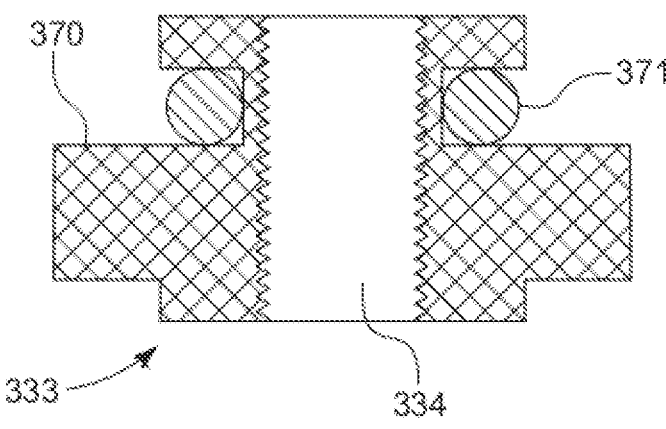
FIG. 10 shows details of a sealing centralizer usable in the health meter.

The sealing centralizer 333 has a threaded flow through annulus and a seating projection shown in FIG. 10.

A compressible straining mesh 89 is used in this embodiment between the convex reinforcing spacer 72a and the compressible decontamination media 50a around the hollow tube 66a.

A sample port 33 is shown.

FIG. 3 also shows a threaded rod with venting port 335.

Figure 11:
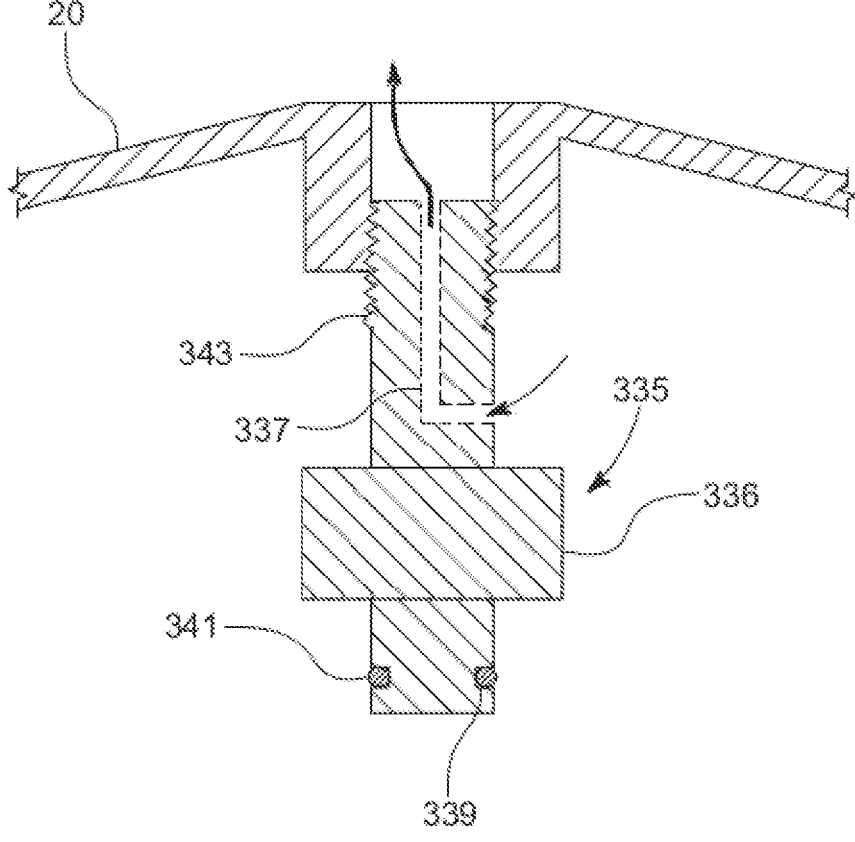
FIG. 11 shows details of a threaded rod with venting port usable in an embodiment of the health meter.

FIG. 11 shows details of the threaded rod wherein the threaded rod with venting port includes a rod body with a central venting bore and threads formed on an outer surface of the rod body for engaging the sealable metal lid.

Returning to FIG. 3, a seal 341 such as a thermoplastic seal is used between the threaded rod with venting port and the docking lid 62a.

In an embodiment, the sealable metal lid of the decontamination device can be threaded to the docking lid.

Figure 4:
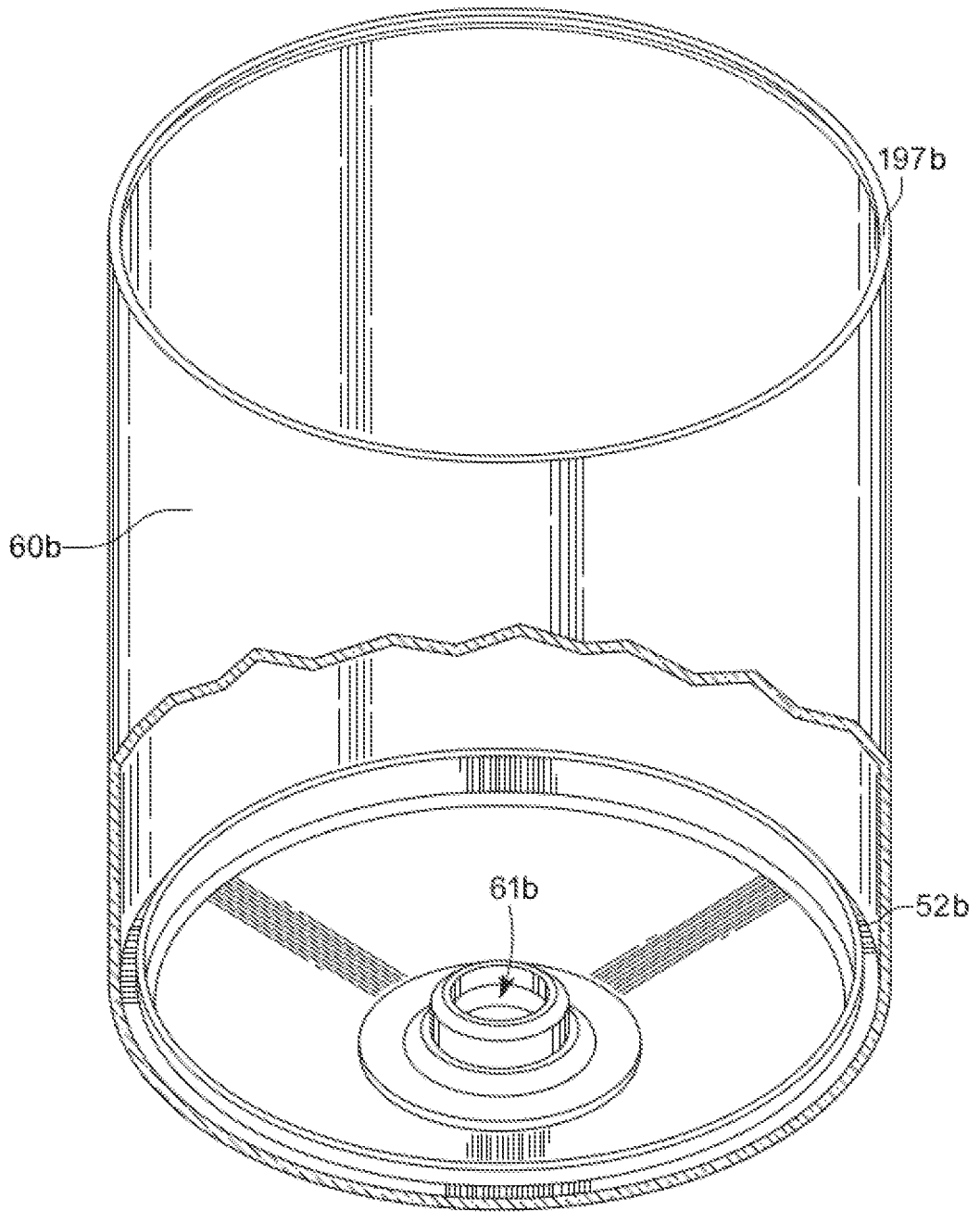
FIG. 4 depicts a cut view of one of the removable open buckets according to one or more embodiments.

FIG. 4 shows a cut view of the bottom of the removable open bucket 60b with a removable open bucket outlet 61b.

A docking lid secures to the removable open bucket on a docking lid locating seat 197b formed in an outer wall of the removable open bucket 60b.

The reinforcing seat 52b is also depicted.

Figure 5:
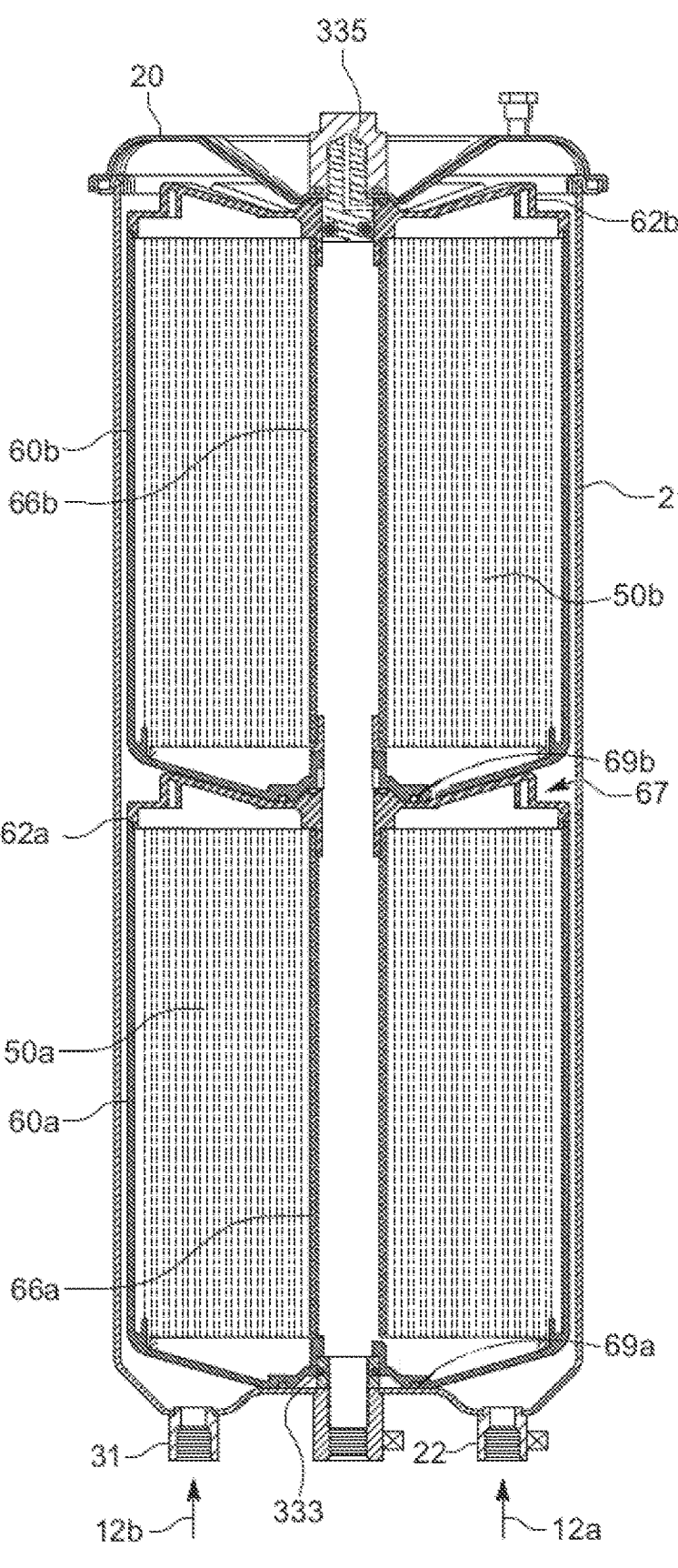
FIG. 5 depicts a two bucket arrangement in a metal casing body according to one or more embodiments.

FIG. 5 is an embodiment shown two removable open buckets 60a, 60b within a single metal casing body 21 secured with a sealable metal lid 20.

Each removable open bucket has a convex reinforcing spacer is disposed around the hollow tube in the removable open bucket opposite the docking lid. The hollow tubes are labelled 66a and 66b.

A compressible decontamination media 50a and 50b are shown. The compressible decontamination media can be layers of wrapped cellulose sheets which are contained between the docking lid 62a and 62b respectively and one of the convex reinforcing spacers which are not labelled in this Figure.

The contaminated fluid 12a and 12b flows through the inlet ports 22 and 31 respectively into the common space 67 between each removable open bucket 60a and 60b and the metal casing body 21 and into the compressible decontamination media 50a and 50b and into each hollow tube 66a and 66b respectively.

A threaded rod with venting port 335 seals the hollow tube 66b from the common space 67 and vents the common space 67 to atmosphere.

Seal rings 69a and 69b are shown.

The sealing centralizer 333 is also depicted. Details on the sealing centralizer are shown in FIG. 10.

In embodiments, a decontamination device receives contaminated fluid that is contaminated lube oil or control fluid which could contain a contaminant, such as water, or acid, or varnish.

Turning now to FIGS. 6A and 6B, a diagram of a controller 34 with processor 35 and computer readable media 36 usable in the health meter is presented.

Two sensors 300a and 300b are shown communicating with the controller 34. These sensors can detect fluid color, fluid temperature, fluid conductivity and particle count in fluid.

Two electrodes 49a and 49b are shown communicating with the controller 34. The electrodes can detect flow rates.

The computer readable media 36 contains preset limits 100 of soluble contaminates and/or insoluble particulates in the compressible layered decontamination media.

The computer readable media 36 contains instructions 102 for receiving detected amounts of soluble contaminants and or insoluble particles in the compressible layered decontamination media from the pair of sensors, and comparing the detected amounts to preset limits of soluble contaminates and/or insoluble particulates in the compressible layered decontamination media and calculating an amount of remaining capacity of soluble contaminants and/or insoluble particulates in the compressible layered decontamination media.

The computer readable media 36 contains instructions 104 for instructing the processor to provide a message to a plurality of client devices simultaneously via the network when detected amounts of soluble contaminants and/or insoluble particles in the compressible layered decontamination media rise above preset limits of soluble contaminates and/or insoluble particulates in the compressible layered decontamination media.

The computer readable media 36 contains instructions 106 for instructing the processor to measure fluid flow at the inlet port and fluid flow through the outlet port and compare electrode measurement.

The computer readable media 36 contains preset fluid flow rates 108 such as 0.5 liters to 40 liters a minute.

The computer readable media 36 contains instructions 110 for instructing the processor to provide a message to a plurality of client devices simultaneously when fluid flow falls below preset flow limits. The message can be a pre-written "check the device now" email or text message to a client device, such as a computer or cell phone.

The computer readable media 36 contains preset particle count quantities 112 such as readings between 18/16/12 and 24/20/19 on the ISO 4406 standard for particle count.

The computer readable media 36 contains instructions 114 for instructing the processor to measure particle count through the outlet port and compare measured particle count to preset particle count quantities.

The computer readable media 36 contains instructions 116 for instructing the processor to generate a message to the plurality of client devices when the particle count exceeds preset particle count quantities.

The computer readable media 36 contains instructions 118 for instructing the processor to measure soluble and/or insoluble contaminants in the compressible layered decontamination media and compare conductivity measurements made by each pair of sensors.

The computer readable media 36 contains preset conductivity measurements 119.

The computer readable media 36 contains instructions 120 for instructing the processor to generate a message to the plurality of client devices when the compared conductivity measurements exceed preset conductivity measurements.

The computer readable media 36 contains preset fluid colors 122.

The computer readable media 36 contains instructions 124 for instructing the processor to measure color of contaminated fluid and/or decontaminated fluid and compared measured color to preset fluid colors and generate a message to the plurality of client devices when the compared fluid color exceed preset fluid colors.

The computer readable media 36 contains preset fluid temperatures 126.

The computer readable media 36 contains instructions 128 for instructing the processor to measure temperature of contaminated fluid and/or decontaminated fluid and compare measured temperature to preset fluid temperatures and generate a message to the plurality of client devices when the compared temperature measurements exceed preset fluid temperatures.

FIG. 7A is top view of a docking lid on the side that engages another open bucket or a threaded rod with venting port that engages a sealable metal lid according to one or more examples of the disclosure.

Figure 7B:
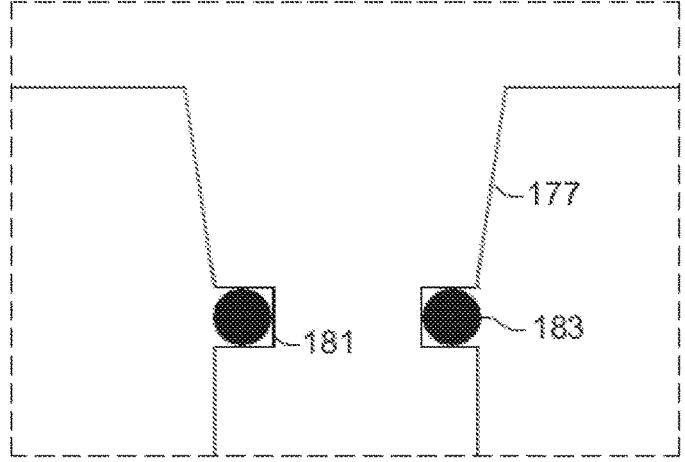
FIG. 7B is a detailed view of a centrally disposed tapered hollow tube locator in a docking lid according to an embodiment.

FIG. 7B is a detailed view of a centrally disposed tapered hollow tube locator in a docking lid according to an embodiment.

Figure 7C:
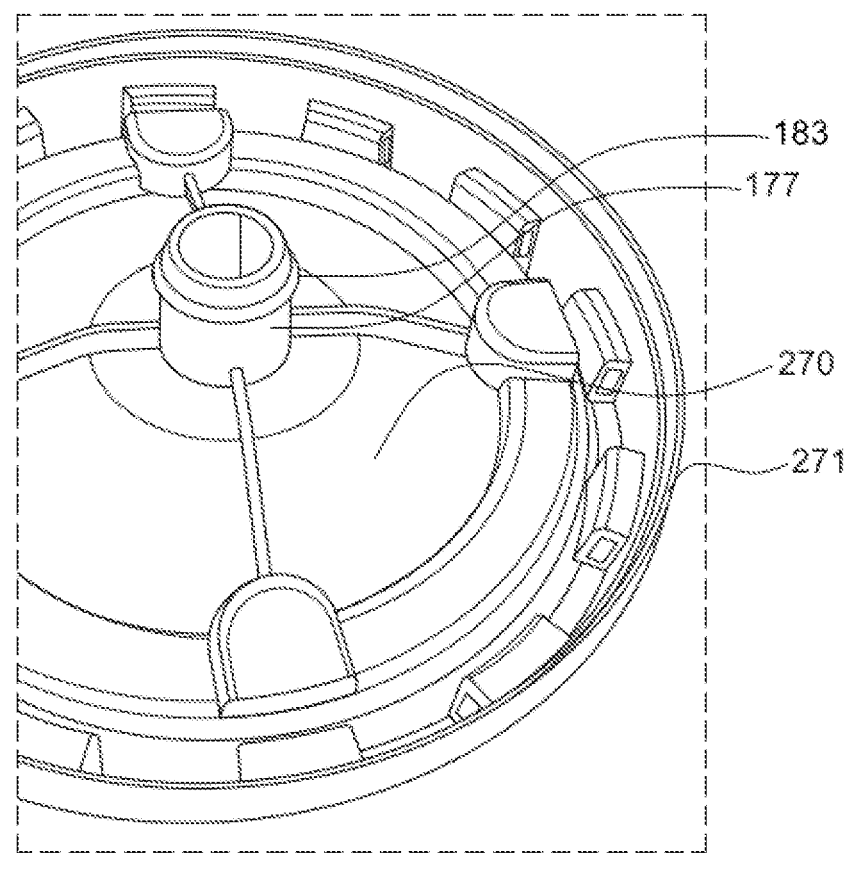
FIG. 7C is a view of an opposite side of the docking lid shown in FIG. 7A.

FIG. 7C is a bottom view of the docking lid of FIG. 7A.

In general, the docking lid is configured to sealingly engage the removable open bucket.

In general, the docking lid has a first side with a plurality of vents formed on a perimeter; a docking connector extending from the first side to engage a second removable open bucket; a moveable stowable handle integrally connected to the first side for disengaging the removable open bucket from a docking connector of an adjacent removable open bucket or from a sealing centralizer.

In general, the docking lid has a second side with a centrally disposed tapered hollow tube locator; and a facing seat engaging the docking lid locating seat of the removable open bucket.

In FIGS. 7A-7C a docking lid 62a is shown that is configured to sealingly engage the removable open bucket.

The docking lid 62a of FIG. 7A shows a first side 260.

The first side that is closest to the sealable metal lid 20 of the health meter has a plurality of vents 64a and 64h are labelled. The vents are formed on a perimeter 263 of the first side of the docking lid 62a.

A docking connector 264 extends outwardly from the first side 260 to engage a second removable open bucket not shown.

A moveable stowable handle 266 integrally connected to the first side 260 for disengaging the removable open bucket from a docking connector of an adjacent removable open bucket or from a sealing centralizer 333.

A seal groove 181 is shown in FIG. 7B and formed on the centrally disposed tapered hollow tube locator 177 with a hollow tube seal 183 disposed in the seal groove 181.

FIG. 7C depicts a second side 270 of the docking lid.

The second side 270 has a centrally disposed tapered hollow tube locator 177 extending from the second side; and a facing seat 271 for engaging the docking lid locating seat 197b (shown in FIG. 4) formed on the removable open bucket.

A seal groove 181 formed on the centrally disposed tapered hollow tube locator has a hollow tube seal 183 disposed in the seal groove.

In embodiments, a plurality of clamps can be used to engage the sealable metal lid to the metal casing body and the metal casing body to the extension cylinder.

Figure 8A:
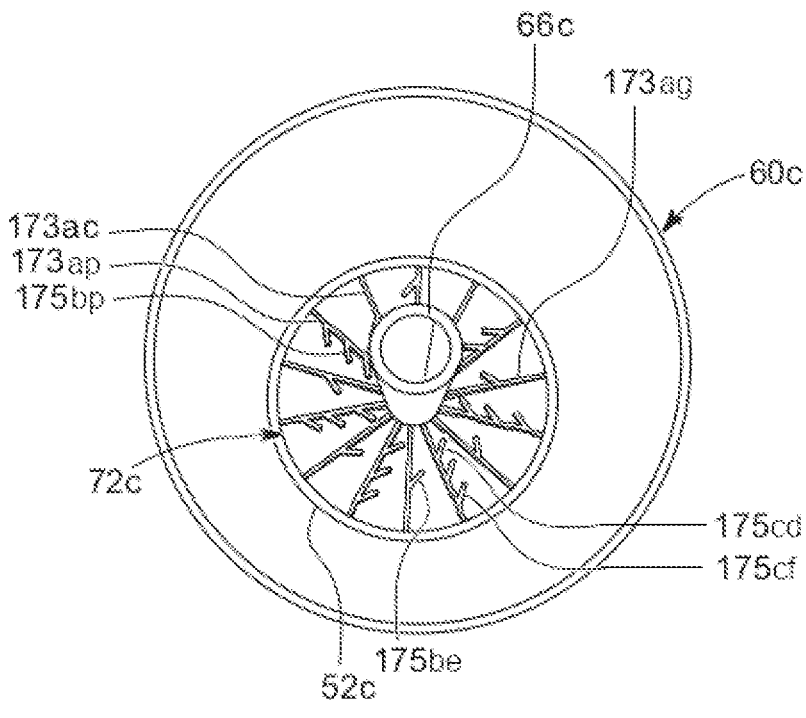
FIG. 8A-8D depict details of an interior and side view of a removeable open bucket according to one or more embodiments.
Figure 8B:
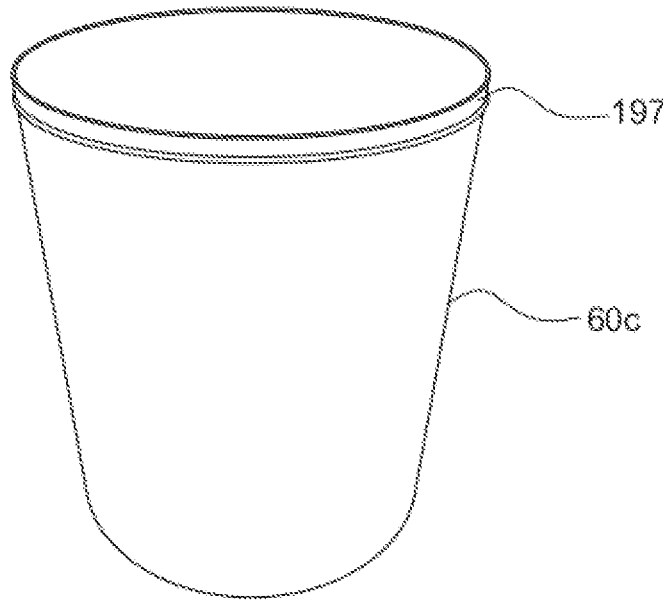
Figure 8C:
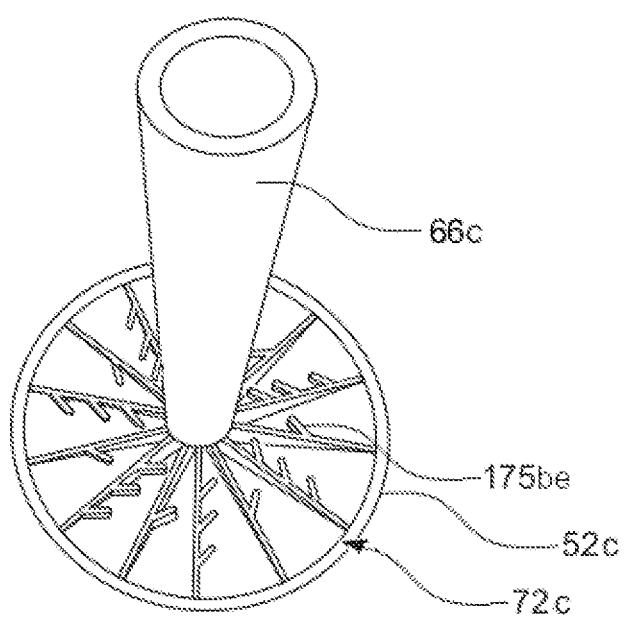
Figure 8D:
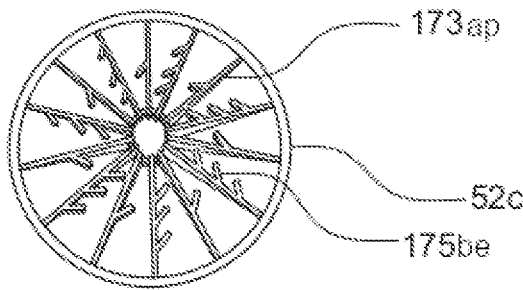

FIG. 8A-8C depict an exploded view of a hollow tube 66c usable in a removable open bucket 60c with details of the convex reinforcing spacer 72c according to one or more embodiments.

The convex reinforcing spacer 72c has a plurality of ribs, 173ac-173ap. 173ag is also labelled. Each rib has at least one reinforcing spoke. Reinforcing spokes 175be-175cf are shown. Reinforcing spokes 175bp and 175cd are also shown.

A docking lid locating seat 197 is shown formed on an outer perimeter of the removable open bucket 60c. A reinforcing seat 52c is shown integrally formed on an interior perimeter of the removable open bucket 60c.

Figure 9:
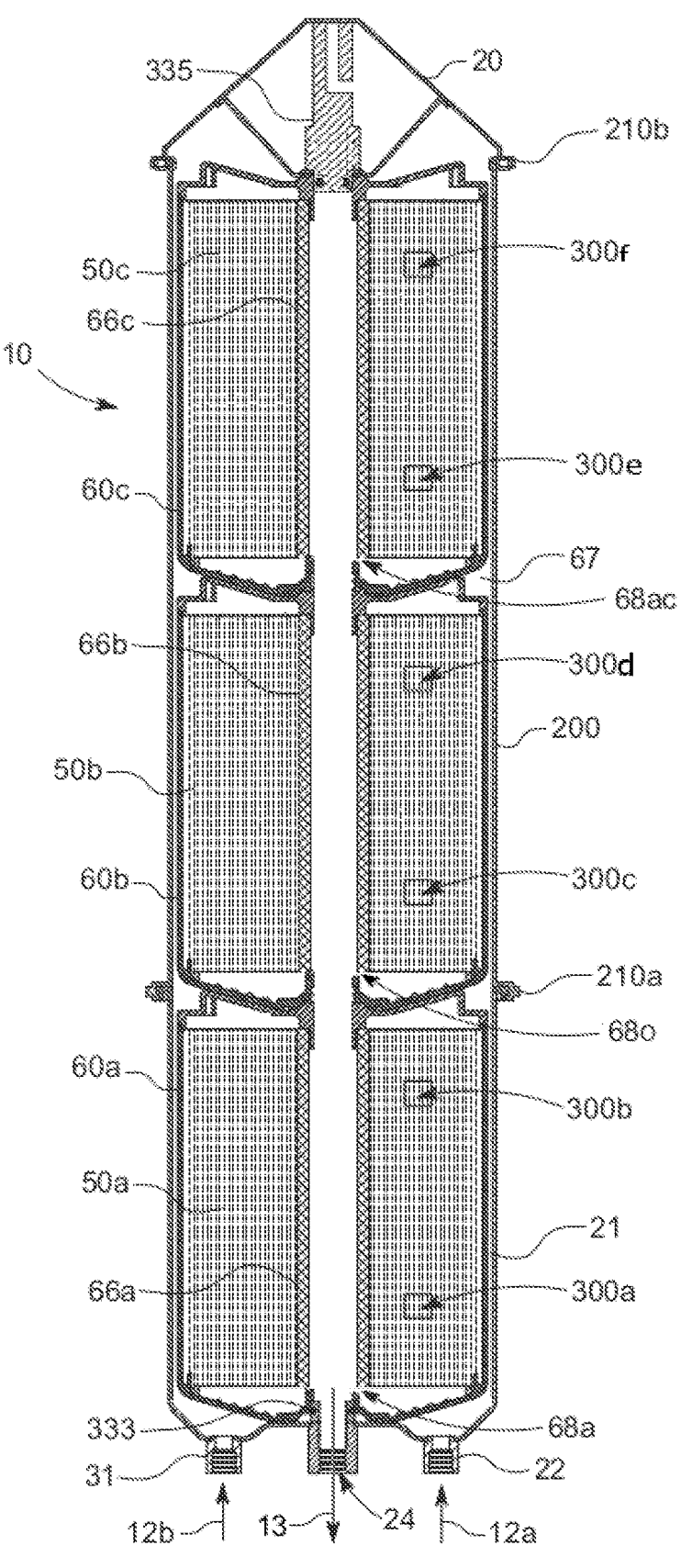
FIG. 9 shows a three open bucket arrangement of the health meter.

FIG. 9 shows another embodiment of the decontamination device 10.

FIG. 9 shows a stacked with three compressible decontamination media 50a, 50b, and 50c.

Each decontamination media contains at least two sensors 300a-300f.

The health meter has a metal casing body 21 with a first inlet port 22 for receiving a first contaminated fluid 12a and a second inlet port 31 for receiving a second contaminated fluid 12b and an outlet port 24 for emitting a decontaminated fluid 13.

The second inlet port 31 in the metal casing body 21 enables parallel connection of multiple decontamination devices for parallel processing.

The metal casing body 21 has a removeable open bucket 60a.

The metal casing body 21 connects to an extension cylinder 200, wherein the extension cylinder 200 can contain at least one removable open bucket 60b, and 60c with each removeable open bucket having an additional compressible decontamination media.

The extension cylinder 200 engages a sealable metal lid 20.

The metal casing body, extension cylinder, and sealable metal lid in embodiments can be made from steel or a non-deforming plastic capable of sustaining pressures from 1 bar to up to 16 bar without deforming.

The extension cylinder 200 attaches to the metal casing body 21 via a clamp 210a and the sealable metal lid 20 attaches to the extension cylinder with clamp 210b.

The first removable open bucket 60a has a first hollow tube 66a which can be made from cardboard. The second removable open bucket 60b and third removable bucket 60c each have their own hollow tubes 66b, and 66c.

Contaminated fluid 12a and 12b flows into a common space 67 between the removable open buckets and the metal casing body 21 and extension cylinder 200 into each compressible decontamination media 50a, 50b, 50c simultaneously then sequentially into the hollow tubes 66a, 66b and 66c.

The decontaminated fluid then flows down through hollow tubes 66a, 66b and 66c providing decontaminated fluid 13 to outlet port 24.

Each compressible decontamination media 50a, 50b and 50c is contained between a docking lid for each removable open bucket 60a, 60b, and 60c and a convex reinforcing spacer for each removable open bucket.

Openings 68a, 68o and 68ac in the reinforcing spacers are shown. A plurality of openings are formed in each reinforcing spacer.

The sealing centralizer 333 and the threaded rod with venting port 335 are also depicted.

FIG. 10 shows details of the sealing centralizer 333.

A sealing centralizer 333 is shown with a seating projection 370 a threaded flow through annulus 334 and a sealing assembly 371 which can be an o-ring.

FIG. 11 shows details of threaded rod with venting port 335.

The threaded rod with venting port 335 that engages the sealable metal lid 20.

The threaded rod with venting port has a rod body 336, a central venting bore 337, threads 343 and seal 341 in a sealing groove 339. The flow path through the central venting bore is shown with a lower inlet and upper outlet.

In embodiments, the extension cylinder 200 can be the same diameter as the metal casing body, or a different diameter.

The wall thickness of the extension cylinder should be the same thickness as the metal casing body, unless a different material is used, wherein the thickness can change.

An exemplary extension cylinder length can be 750 millimeters with an inner diameter that matches the metal casing body such as 196 millimeters and a wall thickness of 1.65 mm, and wherein the extension cylinder can be made from non-deforming metal capable of sustaining pressure from 100 to 300 psi.

In embodiments, the sensors and the electrodes can communicate with a processor 35 by blue tooth or Wi-Fi or similar.

The sensors can transmit two different conductivity measurements to the processor. The processor then compares the conductivity measurements and when the measurements exceed a preset limit, the processor provides an alarm which can be in the form of a prewritten message or a large icon such as a red "bar" that indicates the amount of remaining contaminant capacity of the compressible decontamination media.

In an embodiment, the central hollow tube 66*a* in the first removable open bucket is fluidly connected to the second and third hollow tubes without threadably engaging each hollow tube.

In the embodiments of FIG. 9, the second removable bucket 60*b* can seat itself into a first docking connector of the first docking lid of the first removable open bucket.

The third removable bucket 60*c* seats itself a second docking connector of the docking lid 62*b* of a second removable bucket 60*b*.

Contaminated fluid flows into the extension cylinder 200 between the extension cylinder through a common space 67 for processing through a plurality of compressible decontamination media 50*a*-50*c* then into the hollow tubes 66*a*-66*c* as cleaned and decontaminated fluid 13.

EXAMPLES

In a first example, the health meter for contaminated fluid can clean turbine lube oil fluids.

The health meter has a metal casing body with sealable metal lid. The decontamination device of this example can have a stainless steel sealable metal lid that attaches to a stainless steel metal casing body. In this example, the sealable metal lid can be 212 millimeters in diameter. The metal casing body can have a volume of approximately 6 liters. The sealable metal lid of this example attaches to the metal casing body with a clamp, a sealing centralizer and a threaded rod with venting port.

The metal casing body has at least one inlet port for receiving at least one contaminated fluid and an outlet port for emitting a decontaminated fluid.

As an example, the metal casing body can have a first inlet port that is 13.3 millimeters in diameter for receiving contaminated fluid at a flow rate of one liter per minute per compressible decontamination media used in a removable open bucket.

As an example, the outlet port can have the same dimensions as the inlet port. The outlet port allows decontaminated fluid to flow out the metal casing body.

The sealing centralizer can have a threaded flow through annulus and can be made from aluminum, stainless steel or a rigid non deforming polymer.

The sealing centralizer has an annulus that is threadably engagable with the outlet port of the metal casing body.

The sealing centralizer has a seating projection which can be 20% to 50% larger in diameter than the annulus providing support and spacing from the metal casing body for a removable open bucket that is installed in the metal casing body.

The sealing centralizer can have a longitudinal length from 15 to 75 millimeters and still be usable in embodiments.

At least one removable open bucket can be contained within the metal casing body with sealable metal lid.

As an example, the invention can use four removable open buckets stacked on top of each other via the docking lids, all contained in one metal casing body secured with one sealable metal lid.

In this example, the four removable open buckets can be used in parallel to decontaminate fluid simultaneously.

In embodiments, an extension cylinder can be connected to the metal casing body and contain one or more additional removable open buckets.

In embodiments, removable open buckets can have a dimension ranging from 50 to 200 centimeters high by 12 to 60 centimeters wide, such as 0.6 meters by 1.0 meter.

The material of the removable open bucket can be made from a plastic, or a reinforced plastic, and may be made from crystalline polypropylene homopolymer that may include additional additives, such as antioxidant corrosion inhibiting stabilizers.

Each removable open bucket has a tapered docking base which includes a removable open bucket outlet for the/ accommodating/allowing decontaminated fluid outflow.

The removable open bucket also has a reinforcing seat formed on an interior perimeter of the removable open bucket.

As an example, the docking lid can be made from the same material as the removable open bucket.

The docking lid for use in treating transmission fluid from a turbine engine can have 28 openings (or vents). Each opening can be positioned equidistantly around a center in the docking lid. Each opening can have a dimension that is triangular such as, a 13 square millimeter opening.

The docking lid engages a docking lid locating seat formed on an upper edge of the removeable open bucket opposite the tapered docking base.

Inside the open bucket is a convex reinforcing spacer positioned within the reinforcing seat.

In this embodiment, convex reinforcing spacers are formed to be integral and as a part of each removable open bucket.

Each convex reinforcing spacer of this example is made from hard plastic with rounded beveled edges engaging the compressible decontamination material, and specifically excluding a knife like edge. The embodiments provide a safer environment because the reinforcing spacers do not have sharp edges.

Each convex reinforcing spacer is within a reinforcing seat without clipping in and each convex reinforcing spacer supports the compressible decontamination media in the removable open bucket.

The convex reinforcing seat can have a plurality of ribs, 4 to 12 ribs can be used.

Each rib can have a reinforcing spoke that can be 5-10 millimeters in length and increased surface area to support the decontamination media.

The convex reinforcing spacer is integrated inside the removable open bucket around the removable open bucket outlet forming a plurality of openings. The openings can range from 4 to 20 openings, and each opening can have a width of 2-5 millimeters.

A seal locating groove having a depth from 2 to 4 millimeters can be formed on an external side of the tapered docking base for engaging a seal ring that can be of thermoplastic material.

A docking lid is configured to sealingly engage the removable open bucket.

The contaminated fluid flows through a plurality of openings in the docking lid simultaneously, then into and through compressible decontamination media and then into the hollow tube. Twenty four (24) openings are used in this example per docking lid.

In this example, fluid pressure in the metal casing body with sealable metal lid is maintained at about 2.5 bar. As the metal casing body heats up, the metal casing body expands slightly and then as the metal casing body cools, the metal casing body returns to its original shape.

In other embodiments, the contaminated fluid can be processed at gravimetric pressure.

The docking lid can be made from polymer.

The docking lid can have a first side with 12 vents formed on a perimeter of the first side.

The docking lid can be 1.5 to 3 millimeters thick in this example.

A docking connector can extend from the first side 10 to 50 millimeters to engage a second removable open bucket. The docking connector is round and has a flow through annulus.

A moveable stowable handle is formed in this first side of the lid. The handle is integrally connected to the first side for disengaging the removable open bucket from a docking connector of an adjacent removable open bucket or from a sealing centralizer. The handle can be a one part or two part structure.

The docking lid has a second side with a centrally disposed tapered hollow tube locator extending from the second side from 25 to 45 millimeters and has a diameter that matches the inner diameter of the hollow tube.

The docking lid has a facing seat for engaging the docking lid locating seat 197 of the removable open bucket. The facing seat can be 5 to 7 millimeters deep for a secure engagement.

The example includes a hollow tube connected between the centrally disposed hollow tube locator and the removable open bucket outlet.

The hollow tube can be made from polymer or cardboard and can be from 150 to 460 millimeters in length with a 20 to 70 millimeters inner diameter to fit inside the removable open bucket.

A compressible layered decontamination media is contained between the docking lid and the convex reinforcing spacer.

Each of the removable open buckets can have a compressible decontamination material.

In an embodiment, the compressible decontamination material can be identical.

In other embodiments, the compressible decontamination material can differ from removable open bucket to removable open bucket.

A hollow tube can be used in the removable open bucket that can be 200 millimeters long with an opening at the lower center of the hollow tube. The opening can be 26.2 millimeters in diameter. The hollow tube can be made from cardboard.

The hollow tube flows decontaminated fluid, that is, "cleaned fluid" to the outlet port.

In this example, four convex reinforcing spacers are used, one in each removable open bucket.

In this example, the four compressible decontamination medias can be identical, such as a roll of one continuous sheet of recycled paper wherein the sheet is 0.001 centimeters thick and each sheet is as tall as the removable open bucket is tall, and up to 10% less in height.

Each compressible decontamination media is contained between the docking lid and the convex reinforcing spacer. The continuous sheet can be 260 meters in length wound around the hollow tube.

In other embodiments, the compressible decontamination media can be made from different materials, that is, one removable open bucket can have one material, while a second removable open bucket has a different compressible decontamination material. In another embodiment, the compressible decontamination media can be made from a first spongy cellulose on the outside (a first material) and a different type of contaminant absorber (a second material) around the hollow tube That is, the spongy cellulose is wound around the second material.

Four reinforcing seats are used in this example. Each reinforcing seat engages around one of the hollow tubes.

A pair of sensors can be encapsulated between layers of the compressible layered decontamination media.

The pair of sensors are in communication with a controller having a processor with instructions for receiving sensor data from each sensor.

The sensor data is used by the processor to determine the contamination differential between the two sensors to give an indication of remaining capacity of the compressible decontamination media.

The sensors can be twin electrodes both connected to a battery and having a wireless transmitter that detects conductivity of the fluid in the decontamination media and transmits by blue tooth or Wi-Fi to the processor of the controller.

The decontaminated fluid flows from the inlet port in the metal casing body through a common space between the metal casing body and the removable open buckets through vents in the docking lid into compressible layered decontamination media surrounding a hollow tube extending from the docking lid to the sealing centralizer to the outlet port while continuously monitoring remaining capacity of the health meter.

In embodiments, a second inlet port in the metal casing body enables parallel connection of multiple decontamination devices for parallel processing.

In embodiments, the metal casing body and sealable metal lid are steel or a non-deforming plastic capable of sustaining pressures from 1 bar to up to 16 bar without deforming.

In other embodiments, an inlet electrode, positioned in or proximate to the outlet port, can be used to detect contaminants such as 10 ppm water, particulates, and/or varnish An inlet electrode can be positioned in or proximate to an inlet port and can provide a delta of contaminant percentage change between inlets and outlet.

The controller for the health meter can be a programmable logic circuit with associated memory, which is "computer readable media" that is non-evanescent.

In an example, when the controller is a computer, the controller can be in wired or wireless communication with a global communication network.

The controller can have a processor made by Raspberry Pic™ or Intel™ and computer readable media.

In an embodiment, the processor can be a cloud based processor.

Computer readable media can be a memory area, a jump drive, a hard drive or a cloud-based memory area.

The computer readable media can contain instructions to instruct the processor to measure fluid flow through the inlet port or plurality of inlet ports.

The computer readable media can contain instructions to instruct the processor to compare measured fluid flow through the outlet port.

The computer readable media can contain instructions to instruct the processor to provide a stored message to a plurality of client devices simultaneously when fluid flow falls below stored flow limits.

The stored messages are in the computer readable media, such as the message: "check inlet port" when the compared flow rate is 10% less than stored flow limits for this transmission fluid.

The stored flow limits can be a rate of flow through the inlet port by type of fluid, such as 10% water in hydraulic oil at two liters per minute.

The computer readable media can contain instructions to instruct the processor to measure contaminant through the outlet port, such as measure glycol content in the fluid by concentration.

The computer readable media can contain instructions to instruct the processor to compare measured contaminant to stored contaminant concentrations.

Examples of stored contaminant concentrations can be 0.1 to 0.001% glycol in hydraulic fluid, which is acceptable at a flow rate of one liter per minute.

The computer readable media can contain instructions to instruct the processor to generate a stored alarm to the plurality of client devices simultaneously when the measured contaminant exceeds stored preset contaminate concentration.

The computer readable media containing the stored contaminant concentrations can be a range of concentrations for a range of transmission fluids.

The stored alarms could be text alarms such as the message: "urgent-act now-contaminant issue" accompanied by buzzing, beeping or a big question mark as a visual indicator.

The client device can be cell phones, laptops, tablets, personal computers, wearable computers, or similar communication and processing devices capable of bidirectional communication.

For example, if the contaminant is water, and the inlet electrode detects water in the decontaminated fluid. The decontaminated fluid exits the outlet port. Then the instruction in the computer readable media compares the measured contaminant to contaminant concentrations stored in the computer readable media. The instructions generate and transmit an alarm to three operator cell phones when the measured contaminant exceeds the stored contaminant concentration for the transmission fluid, such as 200 ppm of water, or exceeds a stored contaminant differential such as 2% in particulate count for particles having a diameter over four micron.

In embodiments, the health meter metal casing and docking lid are steel or a non-deforming plastic capable of sustaining pressures from one bar to up to sixteen bar without deforming.

In embodiments, the removable open bucket is a flexible removable open bucket.

In embodiments, the health meter has a reinforcing seat that is integral with the removable open bucket positioned at the bottom of the removable open bucket.

In embodiments, the health meter has a convex reinforcing spacer that is integral with the removable open bucket and positioned proximate to the bottom of the removable open bucket.

In embodiments, the convex reinforcing spacer is positioned around the hollow tube in the reinforcing seat.

In embodiments, the convex reinforcing spacer is a disc shape.

In embodiments, the health meter processes as the contaminated fluid, a transmission fluid.

While these embodiments have been described with emphasis on the embodiments, it should be understood that within the scope of the appended claims, the embodiments might be practiced other than as specifically described herein.

What is claimed is:

1. A decontamination device comprising: a metal casing body with sealable metal lid, the metal casing body comprising: (i) at least one inlet port for receiving at least one contaminated fluid; and (ii) an outlet port for emitting a decontaminated fluid; a sealing centralizer comprising: a threaded flow-through annulus and a seating projection; at least one removable open bucket contained between the metal casing body and a sealable metal lid, each removable open bucket comprising;

(i) a tapered docking base comprising a removable open bucket outlet;

(ii) a docking lid locating seat;

(iii) a reinforcing seat formed within the removable open bucket;

(iv) a convex reinforcing spacer positioned within the reinforcing seat around the removable open bucket outlet, the convex reinforcing seat comprising: (i) a plurality of ribs, each rib having at least one reinforcing spoke, and (ii) a plurality of openings; at least one docking lid configured to sealingly engage the at least one removable open bucket; the docking lid comprising:

(i) a first side comprising: a plurality of vents formed on a perimeter; a docking connector extending from the first side to engage a second removable open bucket; a moveable stowable handle integrally connected to the first side for disengaging the at least one removable open bucket from a docking connector of an adjacent removable open bucket or from the sealing centralizer;

(ii) a second side comprising: a centrally disposed tapered hollow tube locator; a facing seat engaging the docking lid locating seat of the at least one removable open bucket; a hollow tube connected between the centrally disposed hollow tube locator and the at least one removable open bucket outlet; a compressible layered decontamination media contained between the docking lid and the convex reinforcing spacer.

2. The decontamination device of claim 1, comprising a second inlet port in the metal casing body enabling parallel connection of multiple decontamination devices for parallel processing of contaminated fluid.

3. The decontamination device of claim 1, wherein the metal casing body and sealable metal lid are steel or a non-deforming plastic capable of sustaining pressures from 1 bar to up to 16 bar without deforming.

4. The decontamination device of claim 1, wherein the sealable metal lid has a sample port.

5. The decontamination device of claim 1, wherein the removable open bucket, the convex reinforcing spacer and the reinforcing seat comprise a flexible material comprising a polymer selected from the group: polyethylene polyketone (PEEK), homopolymers of polyethylene, homopolymers of polypropylene, polyvinyl chloride and copolymers thereof.

6. The decontamination device of claim 1, wherein the hollow tube comprises: cardboard, a metal, and a flexible material comprising a polymer selected from the group: polyethylene poly ketone (PEEK), homopolymers of polyethylene, homopolymers of polypropylene, polyvinyl chloride and copolymers thereof.

7. The decontamination device of claim 1, wherein the metal casing body and sealable metal lid operate from −20 degrees Celsius to +120 degrees Celsius without clogging, without reducing flow rates, and without deforming dependent on contaminated fluid physical characteristics.

8. The decontamination device of claim 1, comprising: a threaded rod with venting port, wherein the threaded rod with venting port comprises a rod body with a central venting bore and threads formed on an outer surface of the rod body for engaging the sealable metal lid.

9. The decontamination device of claim 1, comprising: a seal groove formed on the centrally disposed tapered hollow tube locator with a hollow tube seal disposed in the seal groove.

10. The decontamination device of claim 1, comprising: an extension cylinder engaging the metal casing body, wherein the extension cylinder contains at least one compressible decontamination media.

11. The decontamination device of claim 10, comprising: a plurality of clamps engaging the sealable metal lid to the metal casing body and the metal casing body to the extension cylinder.

12. The decontamination device of claim 1, comprising: a compressible straining mesh between the convex reinforcing spacer and the compressible decontamination media around the hollow tube.

13. The decontamination device of claim 1, comprising: a seal locating groove formed on an external side of the tapered docking base for engaging a seal ring mounted between the docking lid and the tapered docking base.

14. A health meter for a contaminated fluid comprising the decontamination device of claim 1, wherein the decontamination device comprises a pair of sensors encapsulated between layers of the compressible layered decontamination media transmitting measured physical properties, and wherein the health meter comprises:

a controller with processor and computer readable media in communication with the pair of sensors, the computer readable media containing instructions for:

(1) receiving detected amounts of soluble contaminants and/or insoluble particles in the compressible layered decontamination media from the pair of sensors, (2) comparing the detected amounts to preset limits of soluble contaminates and/or insoluble particulates in the compressible layered decontamination media, (3) calculating an amount of remaining capacity of soluble contaminants and/or insoluble particulates in the compressible layered decontamination media; and (4) provide a message to a plurality of client devices simultaneously via a network when detected amounts of soluble contaminants and/or insoluble particles in the compressible layered decontamination media rise above preset limits of soluble contaminates and/or insoluble particulates in the compressible layered decontamination media;

wherein the health meter receives contaminated fluid via the at least one inlet port of the decontamination device through the vents in the docking lid flows the contaminated fluid into the compressible layered decontamination media with sensors simultaneously forming decontaminated fluid as the controller continuously monitors remaining decontamination capacity of the health meter.

15. The health meter of claim 14, comprising: computer readable media with stored preset fluid flow rates and with instructions for instructing the processor to compare fluid flow measurements from the pair of sensors and provide the message to the plurality of client devices simultaneously when fluid flow falls below preset fluid flow rates.

16. The health meter of claim 14, comprising: computer readable media with preset particle count quantities and instructions for instructing the processor to measure particle count through the outlet port, compare measured particle count to preset particle count quantities and generate the message to the plurality of client devices when the particle count exceeds preset particle count quantities.

17. The health meter of claim 14, comprising: computer readable media with stored preset conductivity measurements and instructions for instructing the processor to measure soluble and/or insoluble contaminants in the compressible layered decontamination media and compare conductivity measurements made by each pair of sensors to stored preset conductivity measurements and generate the message to the plurality of client devices when the compared conductivity measurements exceed preset conductivity measurements.

18. The health meter of claim 14, comprising computer readable media with stored preset fluid colors in the computer readable media and instructions in the computer readable media for instructing the processor to measure color of contaminated fluid and/or decontaminated fluid and compare measured color to preset fluid color and generate the message to the plurality of client devices when the compared fluid color exceeds preset fluid colors.

19. The health meter of claim 14, comprising computer readable media with stored preset fluid temperatures in the computer readable media and instructions in the computer readable media instructing the processor to measure temperature of contaminated fluid and/or decontaminated fluid and compare measured temperature to preset fluid temperatures and generate the message to the plurality of client devices when the compared temperature measurements exceed preset fluid temperatures.

* * * * *